United States Patent [19]

Ingram et al.

[11] 3,843,209
[45] Oct. 22, 1974

[54] HYDRAULIC BRAKING SYSTEMS FOR VEHICLES

[75] Inventors: Brian Ingram, Balsall Common; David Anthony Harries, Shirley, both of England

[73] Assignee: Girling Limited, Birmingham, England

[22] Filed: Sept. 22, 1972

[21] Appl. No.: 291,237

[30] Foreign Application Priority Data
Sept. 22, 1971  Great Britain.................... 44272/71
Nov. 27, 1971  Great Britain.................... 55159/71
Apr. 11, 1972  Great Britain.................... 16530/72

[52] U.S. Cl......... 303/21 CG, 188/181 A, 303/21 F
[51] Int. Cl............................................... B60t 8/12
[58] Field of Search.......... 303/21 CG, 21 F, 21 BB, 303/21 CF, 21 B, 21 R, 21 AF, 21 A, 21 C, 21 EB, 10, 68–69, 6 R, 61–63, 24 R, 24 BB; 188/181, 151 R, 152; 200/16 A, 82 R, 82 C; 340/60, 240

[56] References Cited
UNITED STATES PATENTS
| | | | |
|---|---|---|---|
| 3,546,667 | 12/1970 | Thomas | 340/60 X |
| 3,592,514 | 7/1971 | DeHoff | 303/21 F |
| 3,694,038 | 9/1972 | Ingram et al. | 188/181 A |
| 3,703,319 | 11/1972 | Ingram et al. | 303/21 F |

Primary Examiner—Duane A. Reger
Assistant Examiner—D. C. Butler
Attorney, Agent, or Firm—Imirie, Smiley & Linn

[57] ABSTRACT

In an anti-skid hydraulic braking system an electrical switch is arranged between two relatively movable parts of a braking pressure modulator. This switch can be used in four different ways, either singly or in combination; in a logic circuit for differentiating between a genuine or spurious skid signal while the braking pressure is held substantially constant; in a circuit which alters the threshold value of wheel deceleration triggering the modulator; in a system check circuit; in a pressure control or warning circuit.

24 Claims, 9 Drawing Figures

3,843,209

HYDRAULIC BRAKING SYSTEMS FOR VEHICLES

This invention relates to improvements in hydraulic braking systems for vehicles of the kind comprising a wheel brake, a master cylinder for controlling the pressure of hydraulic fluid applied to the wheel brake, a modulator interposed between the wheel brake and the master cylinder for isolating the wheel brake from the applied pressure and for reducing the braking pressure, and control means sensitive to the deceleration of the braked wheel for actuating the modulator when the deceleration exceeds a threshold value, the control means subsequently deactivating the modulator so that the pressure can increase again, the cycle of reducing and increasing pressure being repeated until the deceleration of the wheel, during the same brake application, is less than the threshold value.

According to the present invention in a braking system of the kind set forth an electrical switch is arranged between two parts of the modulator which move relatively to each other when the modulator is actuated, movement of the parts operating the switch.

In a panic braking situation the pressure applied to the wheel brake rises very rapidly. If the threshold value of deceleration is reached, it may be a transient phase resulting from the wheel passing over a bump in which case the braking pressure should not be reduced. To detect if the wheel is skidding it is necessary to determine if the deceleration remains above the threshold value for a predetermined interval of time.

According to one aspect of the present invention the control means includes an adhesion detector logic circuit capable of deciding whether a wheel deceleration greater than the threshold value indicates that the wheel is skidding, and the switch operates means for holding the braking pressure substantially constant for an interval of time while the logic circuit is deciding.

If the braking pressure were allowed to rise while the logic circuit decided, the wheel might lock. By holding the braking pressure substantially constant the system is posed to increase or reduce the braking pressure depending on the decision of the logic circuit.

Also in a panic braking situation when the threshold value of wheel deceleration is low, say 1g, the speed of the vehicle will not be substantially reduced before the braking pressure is isolated and subsequently reduced. This follows because the deceleration of the wheel is always significantly higher than the deceleration of the vehicle, especially if the wheel no longer adheres to the surface over which it is travelling. Initially it is desirable to obtain a higher deceleration on a surface with a high coeficient of friction. Therefore it is usual to set the threshold value at a higher value, say of the order of 2g. However such a high threshold value increases the cycle time of increasing and decreasing pressure in the brake circuit which is also undesirable when the wheel is travelling over a surface having low friction characteristics.

According to a second aspect of the invention the switch operates means for changing the threshold value from a higher value on an initial or first cycle during which the braking pressure is first reduced, to a lower value on a predetermined later cycle.

In one brake application the deceleration of the wheel may temporarily fall below the threshold value so that communication is re-established between the applied hydraulic pressure and the brake. When this occurs the higher threshold value will become operative again. In effect there may be more than one "first cycle" in any one brake application; for example, mu of the surface over which the wheel is travelling may increase temporarily.

Thus the brake can only be isolated from the applied pressure when the wheel deceleration attains the higher threshold value chosen so that no premature release of the brake can occur. When this higher value is attained usually a genuine change from a high mu surface to a low mu surface is indicated.

Although the change in threshold may be arranged to occur on the third or fourth cycle it is convenient for the change to occur on the second cycle. Furthermore it may be desirable to bring in one lower threshold value on a predetermined later cycle, then reduce the threshold to a second lower value on a subsequent cycle, i.e. it may be desirable to reduce the threshold value successively until it approaches the value at which braking of the wheel is most efficient. Most efficient braking occurs at the maximum point on the mu/slip curve and the threshold value of wheel deceleration may be reduced so that the cycles of increasing and reducing braking pressure become shorter whereby the value of wheel slip also moves over the peak of the mu/slip curve in shorter cycles.

Again it is convenient to use the same lower threshold value for the second and subsequent cycles.

In a braking system which incorporates both the hold means and the means for changing the threshold, the change to a lower threshold value will offset the longer cycle time introduced by the hold means.

According to a third aspect of the invention the switch is included in an electrical check circuit in which a second switch is arranged to actuate the modulator, operation of the modulator switch indicating that the check is successful.

According to a fourth aspect of the invention the switch is included in an electrical indicating circuit in which an indicating device is adapted to warn the driver of the vehicle if the two relatively movable parts of the modulator are not in their normal relative positions.

Examples of the invention in its differenct aspects are illustrated in the accompanying drawings in which.

Figure 1:
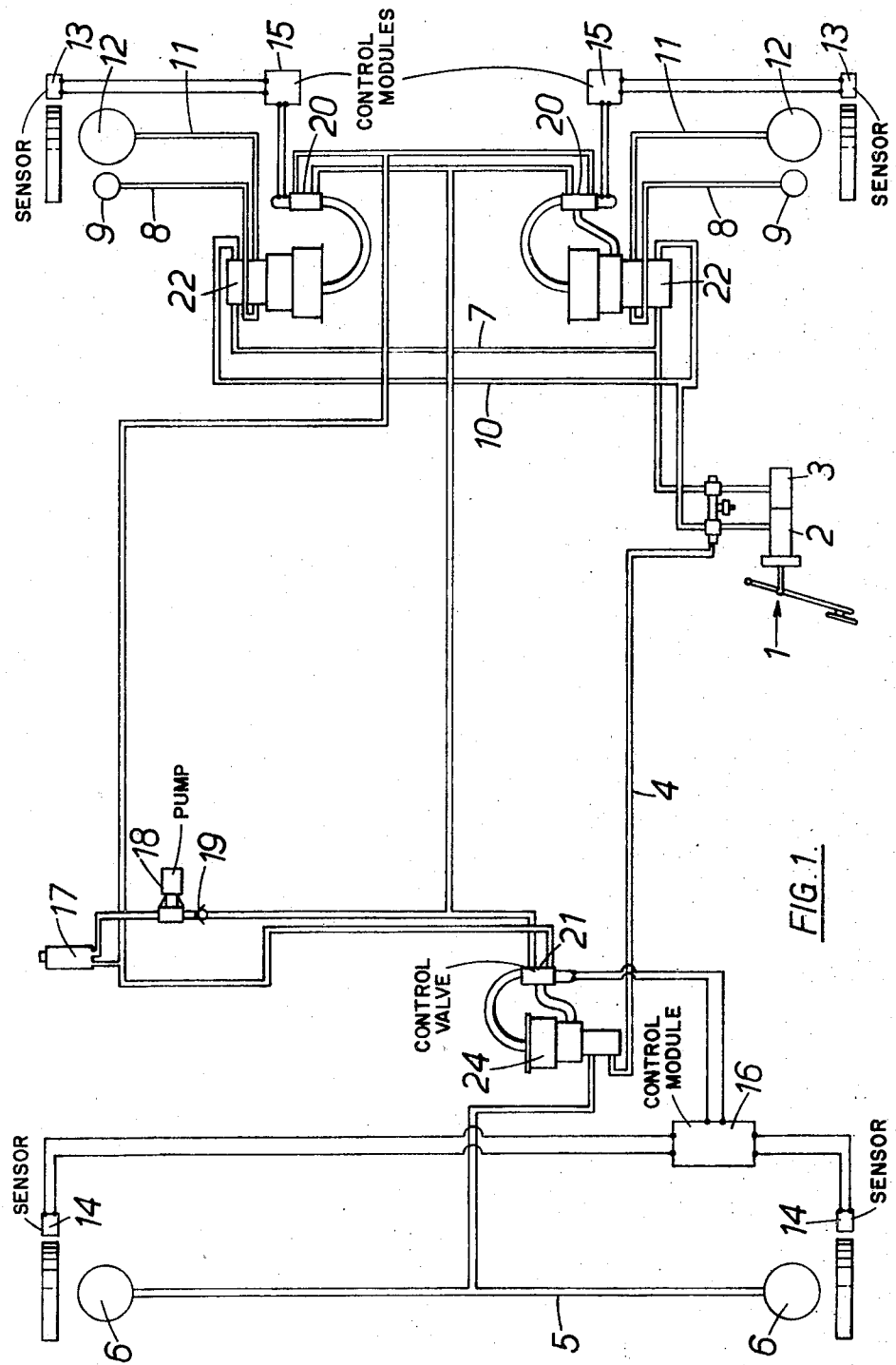
FIG. 1 is a layout of an hydraulic braking system.

In the layout illustrated in FIG. 1, 1 is a pedal-operated master cylinder having two pressure spaces 2 and 3. The pressure space 2 is connected through pipe-lines 4 and 5 to slave cylinders 6 for actuating brakes on the rear wheels of the vehicle, and through pipe-lines 7 and 8 to slave cylinders 9 for actuating brakes on the front wheels of the vehicle. The pressure space 2 is also connected through pipe-lines 10 and 11 to separate slave cylinders 12 for actuating the brakes on the front wheels of the vehicle.

When the brakes are applied the deceleration of each front wheel is sensed by an electrically inductive sensor 13, and the deceleration of each rear wheel is sensed by an electrically inductive sensor 14.

When the deceleration of one or more wheels exceeds a predetermined value the A.C. output from the sensor on that wheel or wheels in question is fed to electronic control means which convert the A.C. signal into a D.C. output. Specifically the output from each sensor 13 is fed to a separate electronic control module 15, and the A.C. signals from the sensors 14 are fed to a common electronic control module 16.

This system includes a supply circuit of hydraulic fluid under pressure comprising a reservoir 17 for hydraulic fluid feeding an electrically driven pump 18. Fluid under pressure from the pump 18 is delivered via a one-way valve 19 through a first circuit to a pair of solenoid-operated control valves 20 connected to the reservoir 17. Simultaneously fluid under pressure from pump 18 is delivered through a second circuit to a third solenoid-operated control valve 21 also connected to the reservoir 17.

Each control valve 20 is adapted to regulate the supply of fluid from the first circuit to a modulator 22 for controlling the braking effort applied to one of the front wheels of the vehicle in response to the D.C. output signal received from the control module 15 to which it is connected. The output signals from each control module 15 are responsive to the deceleration of the front wheels with which that module 15 is associated.

The control valve 21 is adapted to regulate the supply of fluid from the second circuit to a modulator 24 for controlling the braking effort applied to the rear wheels of the vehicle in response to the D.C. output signal received from the control module 16. The output signal from the control module 16 is responsive to the deceleration of the rear wheels of the vehicle.

The pump 18 may pressurize an accumulator incorporating a pressure switch controlling the operation of the pump so that the accumulator is maintained at substantially constant pressure e.g., 300 p.s.i.

Figure 2:
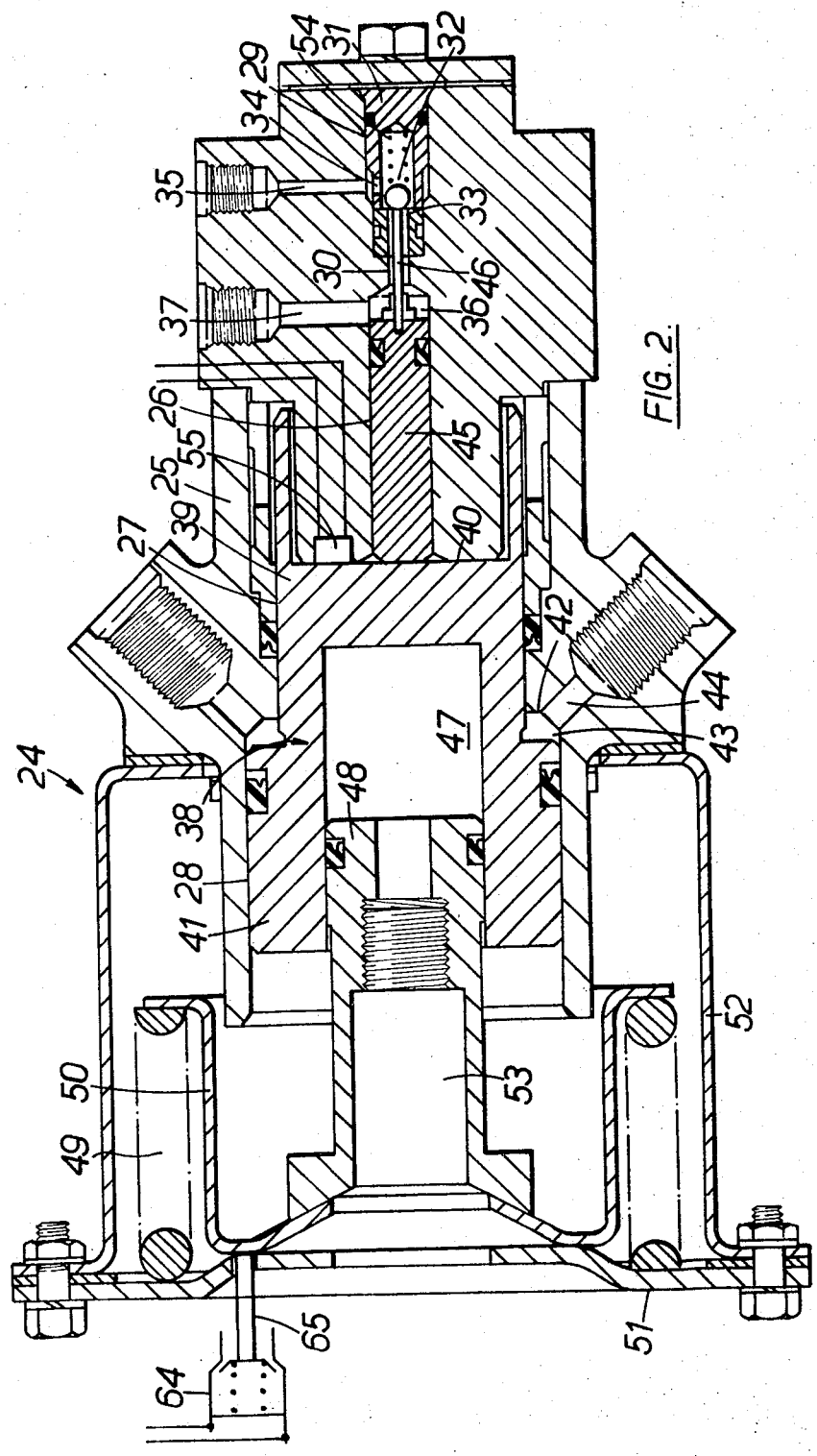
FIG. 2 is a longitudinal section through a modulator for use in the system of FIG. 1.

The modulator 24 of FIG. 1 is shown in more detail in FIG. 2 and comprises a body 25 in which is formed a through bore having three stepped portions 26, 27 and 28 of progressively increasing diameter. The smallest diameter portion 26 of the bore leads into a bore portion 29 of equal diameter terminating at one end of the body 25 through a reduced diameter portion 30. A plug 31 fitted in the bore portion 29 houses a valve member 32 in the form of a ball for engagement with a seating 33. The plug 31 has a radial port 34 connecting the seating 33 with an inlet connection 35 adapted to be connected to the pipe-line 4 from the master cylinder. The portion of the bore 26 terminating at the seating 11 defines a chamber 36 for connection to slave cylinders 6 through an outlet connection 37 and pipe-line 5.

A stepped piston assembly works in the stepped bore and comprises a differential piston 38 working in the portions 27 and 28 of the bore. The piston 38 is arranged such that when the outer end of the portion 39 of lesser diameter is in abutment with a step 40 at the change in diameter between the bore portions 26 and 27, the portion 41 of greater diameter is spaced from a step 42 at the change in diameter between the portions 27 and 28 to define a chamber 43 connected through an inclined drilling 44 to a port in the control valve 21.

The piston assembly also comprises an expander piston 45 which works in the portion 26 of the bore and is of such a length as to project into the chamber 36 when the portion 39 of the differential piston is in engagement with the step 40. The end of the expander piston 45 remote from the portion 39 carries an axially extending stem 46 which projects through the seating 33 and normally holds the ball 32 away from the seating 33 so that the inlet 35 is in communication with the outlet 37. Thus fluid from the master cylinder 1 can pass to the slave cylinders 6 of the rear wheel brakes when the brakes are applied normally.

The larger diameter portion 41 of the differential piston 38 is formed in its outer end with an axially extending recess or blind bore 47 of an area less than the annular area of the step in diameter between the portions 39 and 41 of the piston 38. A piston 48 works the bore 47 and is urged towards the base of the base 47 by a spring 49, the base of the bore 47 acting as a stop. The spring 49 is located between the inner end of a cage 50 surrounding the portion of the body 25 containing at least a part the portion 28 of the bore and engaging with the piston 48, and an abutment plate 51 which is secured to the body 35 and is held in fixedly spaced relationship thereto by an axially extending cage or shroud 52.

The piston 48 has an axial passage 53 leading into the recess 47 to which fluid under pressure is supplied from an hydraulic accumulator or the pump 18 via the inlet of the control valve 21. The pressure fluid applies to the piston 48 a force in opposition to and greater than the force in the spring 49. The force applied to piston 39 by the pressure fluid in recess 47 is greater than the force in a valve return spring 54 plus the force exerted on the expander piston 45 by the fluid pressure from the master cylinder 1 when the brakes are applied. Therefore the valve 32 is normally held in an open position.

For normal operation of the system fluid under pressure is supplied from the master cylinder 1 to the slave cylinders 6 of the wheel brakes to apply the brakes. When the deceleration of one of the rear wheels exceeds a predetermined threshold value a solenoid of the control valve 21 is energized to deliver fluid under pressure to the chamber 43 in the bore portion 28. The supply of fluid to the recess 47 is not interrupted by operating valve 21. The pressure acts on the annular area between the piston portions 39 and 41 to move the piston 38 rearwardly away from the step 42, i.e., the pressure on each side of piston portion 41 is equalized but the annular area is greater than the area of the base of recess 47. Due to the loading in the spring 54 and the master cylinder pressure the expander piston 45 follows this movement to increase progressively the effective volume of the chamber 36 and permit the valve member 32 to engage with the seating 33 and isolate the supply of braking fluid from the master cylinder 1 to the slave cylinders 6 of the wheel brakes. Thereafter further rearward movement of the piston 35 and the expander piston 45 serves to increase still further the effective volume of the chamber 36 to reduce the braking pressure, thus decreasing the rate of deceleration of the wheels and allowing them to re-accelerate.

The control valve 21 is de-energised by the control module 16 after a suitable time interval and the high pressure fluid in space 43 is placed in communication with reservoir 17. Piston 38 and piston 21 now move forwardly to reduce the effective volume of chamber 36 and so increase the braking pressure. If the wheel deceleration still exceeds the threshold value the pistons are reciprocated again and the cycle of the reducing and increasing braking pressure is repeated without valve 32 opening to restore communication between wheel brakes 6 and master cylinders 1. Valve 32 is reopened when the wheel deceleration falls below the threshold value.

According to the invention a switch 55 is embodied in the modulator 24 (or modulator 22). The switch 55 is shown schematically in FIG. 2 but includes a pair of contacts mounted in the body 25 adjacent bore 26. The contacts may be connected to a push-button switch member which holds the contacts closed when the differential piston 38 is in abutment with the step 40. Alternatively the piston 38 may bridge the contacts when the piston 38 abuts step 40.

Figure 3:
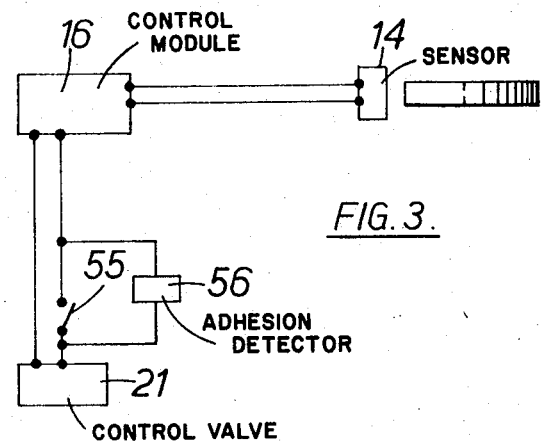
FIG. 3 is a diagram of a system control circuit including a switch in the modulator of FIG. 2.

As shown in FIG. 3 the switch 55 is included in the circuit connecting the control module 16 with the solenoid valve 21 and is in parallel with an adhesion detector logic circuit 56. In operation switch 55 is normally closed so that a signal from the control module 16 operates the solenoid to pressurize space 43 and so opens the switch 55. At the same time the signal is received by the adhesion detector logic circuit 56 which is able to decide whether the signal is caused by a change in wheel adhesion, or by a bump in the road. If the logic circuit decides that the signal indicates wheel slip, then the circuit to solenoid valve 21 is closed by-passing switch 55. Obviously switch 55 could be use to trigger a relay that controls the solenoid or at any other convenient point in the circuit to achieve the same result.

The advantage of this arrangement is that the braking pressure is held substantially constant in the time interval while the logic circuit in deciding, for example, an interval of 12 milliseconds. Operation of switch 55 occurs after valve 32 has shut and ideally piston 38 should remain in a fixed position while the logic circuit decided. In practice it is not convenient to hold the piston 38 steady. After valve 21 is deenergized it continues to move rearwardly to relieve the braking pressure slightly before it reverses to increase the braking pressure up to the hold pressure, i.e., most of the 12 milliseconds is spent reversing the direction of movement of a relatively large piston. However, this time interval does include the time delays that would be inevitable in relieving the braking pressure e.g., 3 or 4 milliseconds for moving the piston 38.

Figure 4:
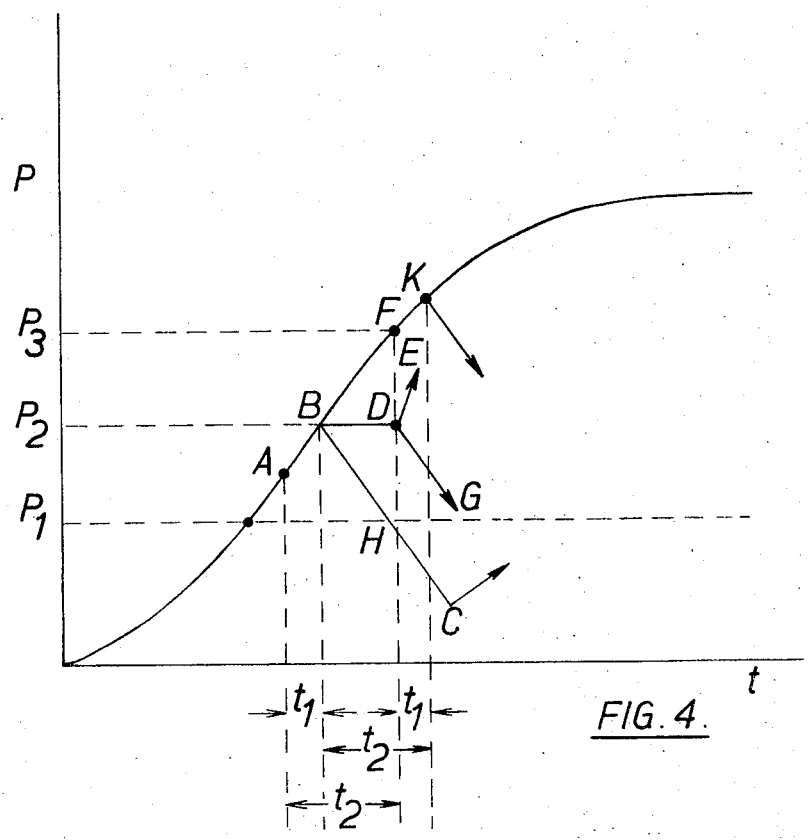
FIGS. 4 to 6 are illustrative curves of braking pressure against time for the system.
Figure 5:
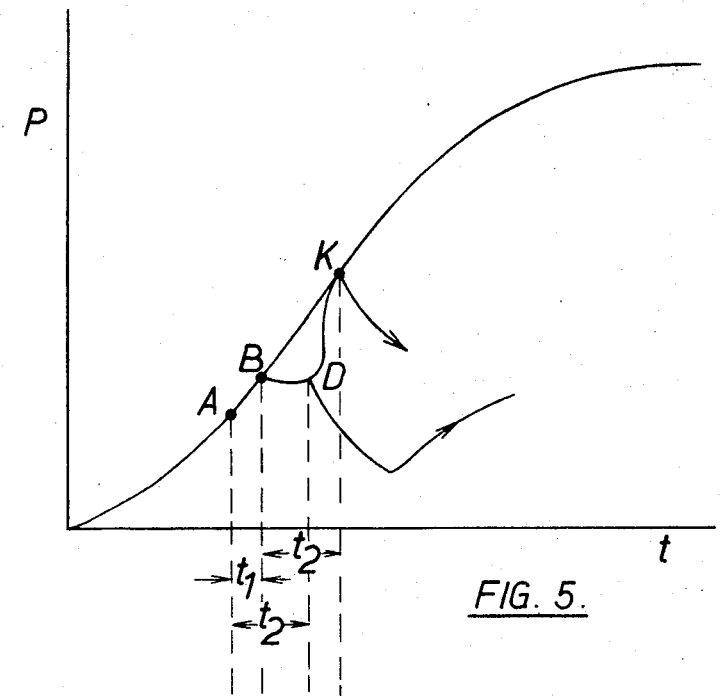
Figure 6:
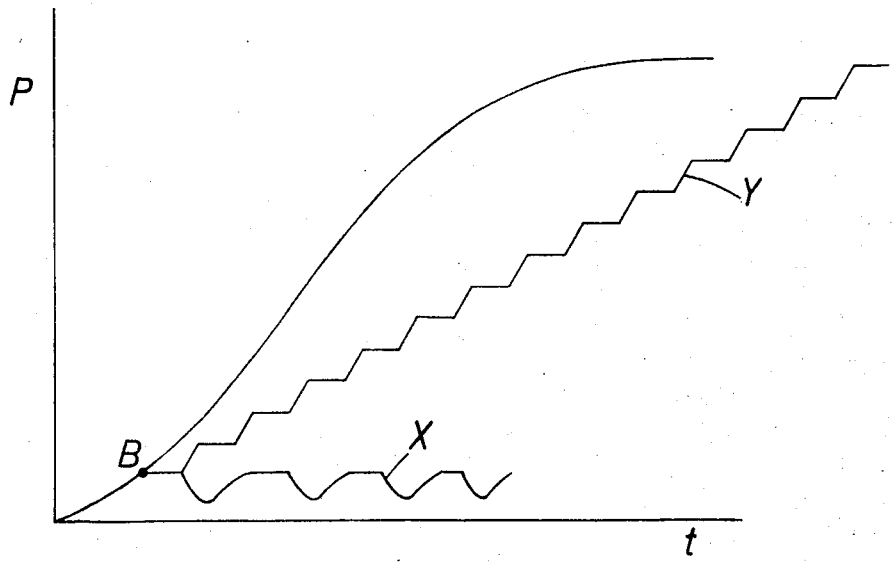

The changes in the braking pressure that occur in the system are best illustrated in the graphs shown in FIGS. 4 to 6. In FIG. 4 the rise of braking pressure is plotted against time and, $t_1$ = time delay of the system, i.e., the time from solenoid receiving the signal to closure of valve 32.

$t_2$ = time taken for logic circuit 56 to differentiate between a genuine and spurious skid signal.

In order to provide a system with a fast response $t_1$ must be as small as possible, but if the logic circuit were omitted the system would be susceptible to spurious systems. Suppose a skid signal is received at A when the pressure is $P_2$, then at B the pressure would start to reduce towards C which would be correct if the signal was due to a change to a lower adhesion and the maximum braking pressure for the new condition was $P_1$. If the signal was spurious and the adhesion was in fact higher, then the pressure should be higher than $P_2$.

If a simple delay $t_2$ is put into the system, to delay operation of valve 21 until a logic circuit has examined the signal then the pressure would reach F ($P_3$) before solenoid 21 operated and would reach K before the modulator started to reduce the pressure. This would be far bove $P_1$ for the low adhesion surface and could cause wheel locking.

Now if at B the pressure is held constant for a time interval $t_2-t_1$, at D the pressure will reduce towards G if the signal is genuine but will increase towards E if the signal is spurious. The degree of over pressurization for the low mu surface is $P_2-P_1$ which is not worse than it was originally although occurring over a longer time interval, and the degree of under pressurization for the high mu surface is $P_3-P_2$ which is far better than originally where the pressure would have been at H after time $t_1$.

FIG. 5 illustrates the curves of FIG. 4 as modified by utilizing the circuit of FIG. 3. FIG. 6 illustrates the effect of the system on braking under skid conditions (curve X) and on a bumpy road (curve γ).

Figure 7:
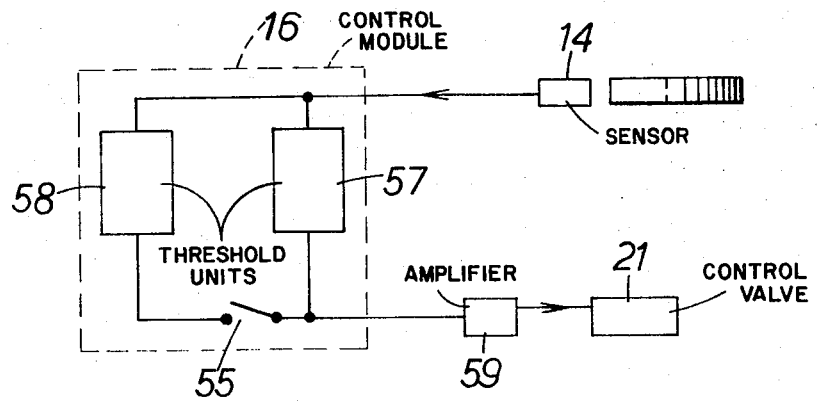
FIGS. 7 to 9 are further circuit diagrams including a modulator switch.

As shown in FIG. 7 switch 55 can be included in a circuit of the control module 16 which incorporates two units 57 and 58. These units are connected in parallel between the sensor 14 and a power amplifier 59 connected to the control valve 21. When the switch 55 is closed the threshold value of units 57 and 58 is higher, say 1.8g, than the threshold value of unit 57, say 1.3g, which obtains when switch 36 is open. Thus, when the brake is applied normally the switch 55 is closed, so that for the initial or first cycle of a brake application the signal from the wheel sensor 14 is compared with the higher threshold value. When the higher threshold value is attained, due to the deceleration of the brake wheel exceeding the predetermined value, a D.C. output from the control module 14, which is amplified by the amplifier 59, energizes the solenoid of the solenoid-operated valve 21.

Operation of the modulator opens the switch 55 isolating the unit 58. After a time interval the solenoid valve 21 is de-energised and the pressure to the brakes is allowed to increase. Thereafter, during the second and subsequent cycles, the braking pressure is reduced when the lower threshold value is attained unless the switch 55 is reclosed i.e., when valve 32 opens to give a higher braking pressure required when the road adhesion increases.

Thus valve 32 only closes to isolate the brake from the applied pressure when the wheel deceleration attains the higher threshold value. This is chosen so that the vehicle can obtain a high acceleration on a high mu surface without the brake being released prematurely. When this higher value is obtained usually a genuine change from a high mu surface is indicated. Reducing the threshold value for subsequent cycles reduces the time of these subsequent cycles which is desirable in skid conditions.

Figure 8:
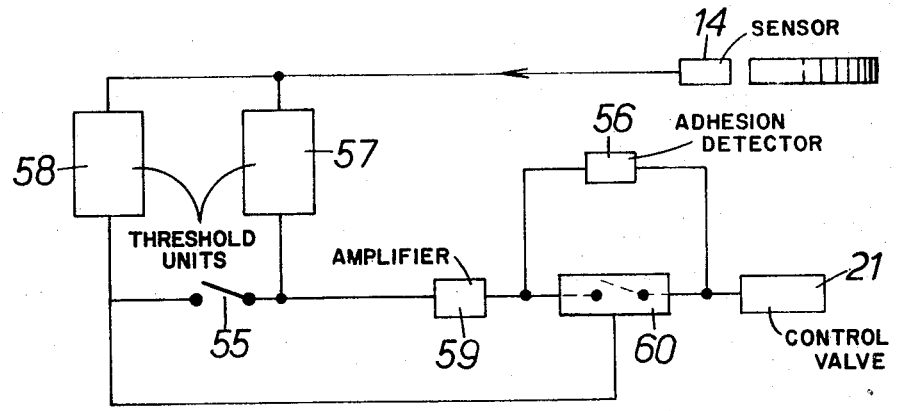

In the diagram shown in FIG. 8 the circuits of FIGS. 3 and 7 are combined showing both the pressure hold feature and the dual threshold feature based on the operation of switch 55. A transistorized relay 60 triggered by switch 55 is arranged in parallel with the adhesion detector logic circuit 56.

Switch 55 and relay 60 are closed in the normal state of the circuit. When the signal from sensor 14 exceeds the higher value of the threshold supplied by units 57 and 58, it is amplified by amplifier 59 and by-passes logic circuit 56 via relay 60 to solenoid 21 to operate the modulator. As soon as the modulator operates to isolate the wheel brake from the applied hydraulic pressure, switch 55 opens, also opening relay 60 and the solenoid will be de-energized holding the braking pressure substantially constant until the logic circuit has decided whether the wheel is skidding or not. A positive signal from the logic circuit will energise the solenoid 21 again to reduce the braking pressure. Subsequent signals from sensor 14 will be compared to the lower threshold value of unit 57 and will be subject to the delay in the logic circuit 56.

Figure 9:
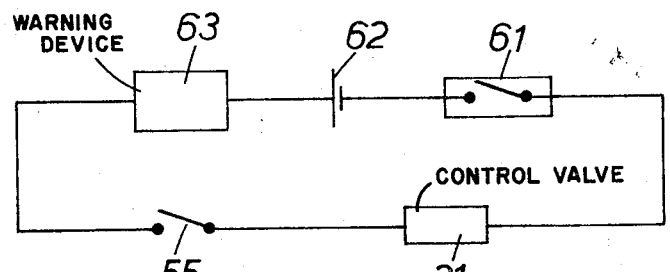

As shown in FIG. 9 switch 55 can also be included in an electrical check circuit. The switch 55 is connected in series with valve 21, a switch 61 operated by the vehicle ignition key, the vehicle battery 62, and a lamp 63 or other appropriate warning device. On turning the ignition key, switch 61 closes for a predetermined interval of time and the warning device is energized, since switch 55 is normally closed. Valve 21 is also energized and piston 38 operates to open switch 55 thus completing the check successfully, the warning device and the solenoid being de-energized. If, for any reason, the piston 38 did not move to open switch 55 then the warning device would stay on for as long as determined by switch 61.

It will be seen that the circuit checks as follows:
1. Electrical parts of solenoid control valve 26;
2. Operation of solenoid valve;
3. Operation of piston 38;
4. Pressure of fluid in modulator circuit since piston 38 will not move unless pressure is adequate; and
5. Pressure seals in modulator.

The advantage of embodying the switch 55 between two relatively movable parts of the modulator is that the check is automatically completed as soon as the modulator operates.

A second switch 64 (FIG. 2) is incorporated in the modulator 24 to act as a check on the pressure of the hydraulic fluid in the recess 47. The switch 64 has a probe 65 which projects through the abutment plate 51 and engages with the adjacent end of cage 50. The switch 64 embodies a pair of contacts which are operated by probe 65. Normally cage 50 abuts plate 51 i.e. when the pressure in recess 47 is at or above its correct value, for example 300 p.s.i., but when the pressure within recess 47 drops, the cage 50 moves away from plate 51 and movement of the probe 65 operates the switch. Cage 50 normally moves away from plate 57 when the modulator is actuated since, in effect, operation of solenoid valve 21 connects recess 47 with chamber 43 to equalise the pressure on both sides of piston 38. The pressure in recess 47 might drop from 300 to 270 p.s.i. when the solenoid valve operates. Operation of switch 64 can be used to control the pressure in the modulator circuit by controlling the operation of pump 18. Alternatively, or in addition, the switch 64 may actuate an electrically operated warning device, e.g., lamp 63.

It will be understood that the operation of the braking system has been described in relation to modulator 24 for convenience only. The description is equally applicable to either modulator 22 which are similar to modulator 24 except in having an additional expander piston 45 and associated valve 32 in order to control the braking pressure to both front wheel brakes, 9 and 12.

We claim:
1. An hydraulic braking system for a vehicle comprising a wheel brake, a master cylinder for controlling the pressure of hydraulic fluid applied to the wheel brake, a modulator interposed between the wheel brake and the master cylinder for isolating the wheel brake from the applied pressure and for reducing the braking pressure, an electrical switch arranged between two parts of the modulator which move relatively to each other when the modulator is actuated, movement of the parts operating the switch, and control means sensitive to the deceleration of the braked wheel for actuating the modulator when the deceleration exceeds a threshold value, the control means subsequently deactivating the modulator so that the pressure can increase again, the cycle of reducing and increasing pressure being repeated until the deceleration of the wheel during the same brake application, is less than the threshold value, said control means including an adhesion detector logic circuit capable of deciding whether a wheel deceleration greater than the threshold value indicates that the wheel is skidding, and the switch operates hold means for holding the braking pressure substantially constant for an interval of time while the logic circuit is deciding.

2. A braking system as in claim 1 wherein the hold means comprise a solenoid valve controlling the modulator and connected in a circuit with the adhesion detector logic circuit, the switch being normally closed and connected across the logic circuit, the arrangement being such that on a wheel deceleration greater than the threshold the control means provide an electrical signal to energize the solenoid valve, consequent actuation of the modulator opening the switch to de-energize the solenoid until the logic circuit allows the signal to by-pass the switch, the modulator isolating the wheel brake but being deactuated before reducing the braking pressure by a substantial amount, the time interval between isolation and reconnection of the wheel brake being sufficient for the logic circuit to make a decision.

3. A braking system as in claim 1 wherein the switch operates means for changing the threshold value of wheel deceleration from a higher value on an initial or first cycle during which the braking pressure is first reduced, to a lower value on a predetermined later cycle.

4. A braking system as in claim 3 wherein the threshold changing means are adapted to reduce the threshold value to a second lower value at a subsequent cycle.

5. A braking system as in claim 3 wherein the same lower threshold value is used for the second and subsequent cycles.

6. A braking system as in claim 5 wherein the threshold changing means includes two units which when connected in one mode give the control means the higher threshold value and when connected in a second mode give the lower threshold value, the switch being connected between the two units so that in the normally closed position of the switch the units are connected in the first mode and when the switch is opened the units are connected in the second mode.

7. A braking system as in claim 1 wherein the modulator is hydraulically operated.

8. An hydraulic braking system for a vehicle comprising a wheel brake, a master cylinder for controlling the pressure of hydraulic fluid applied to the wheel brake, a modulator interposed between the wheel brake and the master cylinder for isolating the wheel brake from the applied pressure and for reducing the braking pressure, an electrical switch arranged between two parts of the modulator which move relatively to each other when the modulator is actuated, movement of the parts operating the switch, and control means sensitive to the deceleration of the braked wheel for actuating the modulator when the deceleration exceeds a threshold value, the control means subsequently deactivating the modulator so that the pressure can increase again, the the cycle of reducing and increasing pressure being repeated until the deceleration of the wheel, during the same brake application, is less than the threshold value, and means operated by said switch for changing the threshold value of wheel deceleration from a higher value on an initial or first cycle during which the braking pressure is first reduced, to a lower value on a predetermined later cycle.

9. A braking system as in claim 8 wherein the threshold changing means are adapted to reduce the threshold value to a second lower value at a subsequent cycle.

10. A braking system as in claim 8 wherein the same lower threshold value is used for the second and subsequent cycles.

11. A braking system as in claim 10 wherein the threshold changing means includes two units which when connected in one mode give the control means the higher threshold value and when connected in a second mode give the lower threshold value, the switch being connected between the two units so that in the normally closed position of the switch the units are connected in the first mode and when the switch is opened the units are connected in the second mode.

12. A braking system as in claim 8 wherein the modulator is hydraulically operated.

13. A braking system as in claim 8 further comprising an adhesion detector logic circuit included in the control means and capable of deciding whether a wheel deceleration greater than the threshold value indicates that the wheel is skidding, and hold means operated by the switch for holding the braking pressure substantially constant for an interval of time while the logic circuit is deciding.

14. A braking system as in claim 13 wherein the hold means comprise a solenoid valve controlling the modulator and connected in a circuit with the adhesion detector logic circuit, the switch being normally closed and connected across the logic circuit, the arrangement being such that on a wheel deceleration greater than the threshold the control means provide an electrical signal to energize the solenoid valve, consequent actuation of the modulator opening the switch to de-energize the solenoid until the logic circuit allows the signal to by-pass the switch, the modulator isolating the wheel brake but being deactuated before reducing the braking pressure by a substantial amount, the time interval between isolation and reconnection of the wheel brake being sufficient for the logic circuit to make a decision.

15. A braking system as in claim 13 wherein the modulator is hydraulically operated.

16. An hydraulic braking system for a vehicle comprising a wheel brake, a master cylinder for controlling the pressure of hydraulic fluid applied to the wheel brake, a modulator interposed between the wheel brake and the master cylinder for isolating the wheel brake from the applied pressure and for reducing the braking pressure an electrical switch arranged between two parts of the modulator which move relatively to each other when the modulator is actuated, movement of the parts operating the switch, and control means sensitive to the deceleration of the braked wheel for actuating the modulator when the deceleration exceeds a threshold value, the control means subsequently deactivating the modulator so that the pressure can increase again, the cycle of reducing and increasing pressure being repeated until the deceleration of the wheel, during the same brake application, is less than the threshold value, said modulator comprising a body including at least one chamber having an inlet connected to the master cylinder and an outlet connected to the wheel brake, a valve controlling the inlet, a piston assembly movable in a bore in the body in communication with the chamber to vary the effective volume of the chamber to actuate the valve, and a second inlet to the bore, the piston assembly being biassed to normally abut the body of the modulator in which position the effective volume of the chamber is at a minimum value and the first inlet valve is open, and the piston assembly being moved out of abutment with the body on actuation of the modulator by the control means which admits hydraulic fluid under pressure to the bore through the second inlet, movement of the piston assembly closing the valve, increasing the effective volume of the chamber and operating the switch which is arranged between the normally abutting parts of the piston assembly and the body.

17. A braking system as in claim 16 wherein the switch is included in an electrical indicating circuit in which an indicating device is adapted to warn the driver of the vehicle if the two relatively movable parts of the modulator are not in their normal relative positions.

18. A braking system as in claim 16 wherein the switch is included in an electrical check circuit in which a second switch is arranged to actuate the modulator, operation of the modulator switch indicating that the check is successful.

19. A braking system as in claim 18 wherein the second switch is the vehicle ignition switch and the control means include a solenoid valve controlling the modulator, operation of the ignition switch providing the solenoid valve with a dummy skid signal to actuate the modulator.

20. A braking system as in claim 16 wherein the switch is located in the body adjacent a step in diameter of the bore, the piston assembly normally abutting the step.

21. A braking system as in claim 16 wherein the piston assembly has a first area normally subjected to hydraulic fluid under pressure biassing the piston assembly to normally abut the body, and a second area opposed to the first area, hydraulic fluid under pressure being admitted to act on the second area through the second inlet.

22. A braking system as in claim 21 wherein the same supply of hydraulic fluid under pressure is connected to the first and second areas of the piston assembly.

23. A braking system as in claim 22 wherein the first area of the piston assembly forms part of a spring-loaded accumulator.

24. A braking system as in claim 23 wherein a second modulator switch is arranged between two relatively movable parts of the accumulator which are normally in abutment when the accumulator is fully loaded, the switch being included in a pressure indicating or control circuit.

* * * * *